United States Patent [19]
Holzapfel

[11] Patent Number: 5,428,445
[45] Date of Patent: Jun. 27, 1995

[54] INTERFERENTIAL POSITION MEASURING DEVICE

[75] Inventor: Wolfgang Holzapfel, Obing, Germany

[73] Assignee: Dr. Johannes Heidenhain GmbH, Germany

[21] Appl. No.: 884,793

[22] Filed: May 18, 1992

[30] Foreign Application Priority Data

May 18, 1991 [EP] European Pat. Off. ........... 91108119

[51] Int. Cl.$^6$ .......................... H01J 3/14; G01B 9/02
[52] U.S. Cl. ................... 356/356; 250/237 G; 250/231.13
[58] Field of Search ............... 356/354, 356, 400, 401; 250/237 G, 231.13, 231.14, 231.16

[56] References Cited

U.S. PATENT DOCUMENTS

| | | | |
|---|---|---|---|
| 3,162,711 | 12/1964 | Pegis | 88/1 |
| 3,166,624 | 1/1965 | Vargady | 88/1 |
| 4,091,281 | 5/1978 | Willhelm et al. | 356/354 X |
| 4,403,859 | 9/1983 | Ernst | 356/374 |
| 4,528,448 | 7/1985 | Doggett | 250/231 SE |
| 4,602,436 | 7/1986 | Ernst | 33/125 C |
| 4,606,642 | 8/1986 | Nelle | 356/374 |
| 4,654,527 | 3/1987 | Schmitt | 250/237 G |
| 4,667,096 | 5/1987 | Dangschat | 250/231 SE |
| 4,677,293 | 6/1987 | Michel | 250/237 G |
| 4,766,310 | 8/1988 | Michel | 250/237 G |
| 4,776,701 | 10/1988 | Pettigren | 356/356 |
| 4,778,273 | 10/1988 | Michel | 356/374 |
| 4,782,229 | 11/1988 | Ernst | 250/237 G |
| 4,793,067 | 12/1988 | Reimar et al. | 33/125 A |
| 4,850,673 | 7/1989 | Velzel et al. | 350/162.17 |
| 5,009,506 | 4/1991 | Spies | 356/356 |
| 5,155,355 | 10/1992 | Kabaya | 250/237 G |
| 5,214,280 | 5/1993 | Rieder et al. | 250/237 G |

FOREIGN PATENT DOCUMENTS

| | | |
|---|---|---|
| 0096476 | 12/1983 | European Pat. Off. . |
| 0163362 | 6/1988 | European Pat. Off. . |
| 2405341 | 8/1975 | Germany . |

OTHER PUBLICATIONS

U. S. Pat. Application Ser. No. 07/668,041 filed Mar. 12, 1991 to Huber.
U.S. Pat. Application Ser. No. 07/689,729 filed Apr. 23, 1991 to Schwefel.
U.S. Pat. Application Ser. No. 07/777,746 filed Oct. 16, 1991 to Huber et al.
Willhelm, J., "Dreigitterschrittgeber-Photoelektrische Aufnehmer zur Messung von Lageanderungen," dissertation at Technische Universitat Hannover on Jun. 23, 1941, pp. 19-20 (1978).

Primary Examiner—James C. Housel
Assistant Examiner—Long V. Le
Attorney, Agent, or Firm—Hofer Willian Brinks Gilson & Lione

[57] ABSTRACT

The invention relates to an interference device having a light source, detectors, and at least two diffraction elements with identical or only slightly different diffraction structures, wherein the parameters of the diffraction structures of the diffraction elements vary continuously as a function of location.

29 Claims, 11 Drawing Sheets

INTERFERENTIAL POSITION MEASURING DEVICE

Applicants claim, under 35 U.S.C. §119, the benefit of priority of the filing date of May 18, 1991, of a European application, copy attached, Serial Number 91108119.8, filed on the aforementioned date, the entire contents of which are incorporated herein by reference.

FIELD OF THE INVENTION

The invention relates to an interference device having a light source, at least two diffraction elements with identical or only slightly different diffraction structures, and detectors for detecting diffracted, mutually interfering fractional beams to produce a signal.

BACKGROUND OF THE INVENTION

In photoelectric incremental length and angle measuring instruments, it is well known to provide reference marks, to fix and reproduce a defined zero point. For example, U.S. Pat. No. 4,677,293 describes the makeup of a reference mark for generating a reference pulse. Phase gratings are used as graduation markings to diffract the radiation of a light source and direct it to detectors. The evaluation of push-pull or pseudo-push-pull signals furnishes a reference pulse, which is relatively independent of the intensity of illumination (and within certain limits of changes in spacing as well). The pulse width of the reference pulse is substantially determined by the widths of the graduation markings on the graduation-carrying substrate and by the widths of the gaps in the scanning plate.

However, the device described in this patent has the disadvantage that diffraction effects prevent it from producing reference pulses with very small pulse widths. These diffraction effects are apparent upon observation of casting shadows produced by the device. Consequently, the device is inadequate for use in high-resolution measuring systems due to its inability to produce small pulse width reference pulses necessary for such systems. Moreover, in such a device the scanner plate and the graduation-carrying substrate must be kept closely spaced apart from one another.

U.S. Pat. No. 4,778,273 discloses a reference pulse transducer that does not have the disadvantages present in the device disclosed in the '293 patent described above. The device disclosed in the '273 patent comprises a plurality of gratings with periodic graduations with different grating constants, from which signals with differing periods are derived, by the three-grating principle. This principle is more fully described in "Dreigitterschrittgeber-Photoelektrische Aufnehmer zur Messung von Lageänderungen" [Three-Grating Incremental Transducers—Photoelectric Pickups for Measuring Positional Changes], dissertation by J. Willhelm, Technische Universität Hannover [Technical University, Hanover].

The signals produced in the '273 device may be combined in accordance with a Fourier series. As a result, reference pulses of very small width can be produced, which hardly depend on the spacing between the scanner plate and the graduation-carrying substrate. However, the device described in the '273 patent has the disadvantage of furnishing a periodic train of pulses instead of furnishing only a single reference pulse. Consequently, additional provisions must be made to make these pulses distinguishable from one another. Since the pulse spacing cannot be increased arbitrarily, considerable effort and expenditure are needed to select one pulse.

OBJECT AND SUMMARY OF THE INVENTION

It is therefore the object of the invention to create a device of the type described generically above that furnishes a pulse of very small width, which within wide limits are relatively independent of the intensity of illumination and of the spacing between the scanner grating and graduation-carrying substrate.

The above objectives are attained by an interference device for generating signals having a light source, at least two diffraction elements with identical or only slightly different diffraction structures, and detectors for detecting diffracted, mutually interfering fractional beams, wherein the parameters of the diffraction structures of the diffraction elements vary continuously as a function of location.

In another embodiment, the interference device accomplishes the same objectives by using a single diffraction element, wherein the parameters the diffraction structures of the diffraction element vary continuously as a function of location.

Employing, the above-described interference devices advantageously allow one to distinguish among various embodied reference marks.

Another advantage of the device according to the invention resides in the fact that despite the very small width of the reference pulse, scanning of the reference marks is still possible even with a wide scanning spacing. Consequently, scanning of the reference marks is insensitive to changes in the scanning spacing.

Another advantage of the device is it is possible to produce different signal shapes, by means of various embodiments of the reference marks. In this way, a plurality of reference marks may for instance be made distinguishable from one another.

Another advantage of the device according to the invention is that it is not restricted to reference marks. For instance, zero signals for zero sensors may also be produced. A zero sensor serves for the determination of a selected zero position. A zero sensor generates a signal from the form of which there is derivable the deviation from the zero position. According to the invention, the signal course of which can be adjusted within wide limits by means of suitable grating parameters. By suitable choice of the grid parameters in a zero sensor, a signal is generated the course of which presents in the zero position an extremely high slope and cuts the trigger threshold only once in this range. Relative to the trigger threshold the signal of the zero sensor runs can run either to the left or right of the zero position, thus the zero sensor is able to determine direction.

The invention will now be described in further detail in terms of exemplary embodiments, referring to the drawings.

DESCRIPTION OF THE PREFERRED EMBODIMENTS

In one embodiment of the invention a three-grating transducer that furnishes periodic signals, using a period equal to one-half the grating constant. The three gratings A, B, A' each have no periodic scale graduation. Instead their grating constant or scale period d varies along the direction of graduation x and is denoted by $d = d(x)$. Such gratings are known as chirped gratings. If chirped gratings are used for the three gratings, theoretically they can be broken down into many small subgratings, each with a constant grating constant, but where the various grating constants of each subgrating differ from one another. Each subgrating furnishes periodic signals of a different frequency upon small displacements X of the grating B. By superimposing all the signal frequencies, a nonperiodic signal course $S_n(x)$ (where n stands for the nth resultant order) is created, similar to a superimposition of a continuous frequency spectrum in a Fourier integral.

Various functional dependencies of the local graduation period $d(x)$ on the direction x of graduation produce different signal courses $S_n(x)$. When chirped gratings are used, the signal course $S_n(x)$ can also be influenced by the location-dependent variation of other grating parameters, such as field height, width, and length, and the transmission, absorption and shape of the fields. The field height is known in the art to mean the distance from the top of a land of a phase grating to the bottom of the furrow in the phase grating. The field width is known in the art to mean the width of a land of a phase grating as measured along the measuring direction x. The field length is known in the art to mean the length of a land of a phase grating as measured along a direction perpendicular to the measuring direction x.

The signal shape $S_n(x)$ is also determined by the phase position of the various frequency components that contribute to the various subgratings. These phase locations can be displaced, by shifting the various grating fields in the subgratings of the diffraction grating B relative to the corresponding ones of the diffraction gratings A and A'. The signal shape $S_n(x)$ can thus be varied within wide limits. Thus, when several reference marks are executed, they can be distinguished from one another by reason of the different signal courses.

Figure 1:
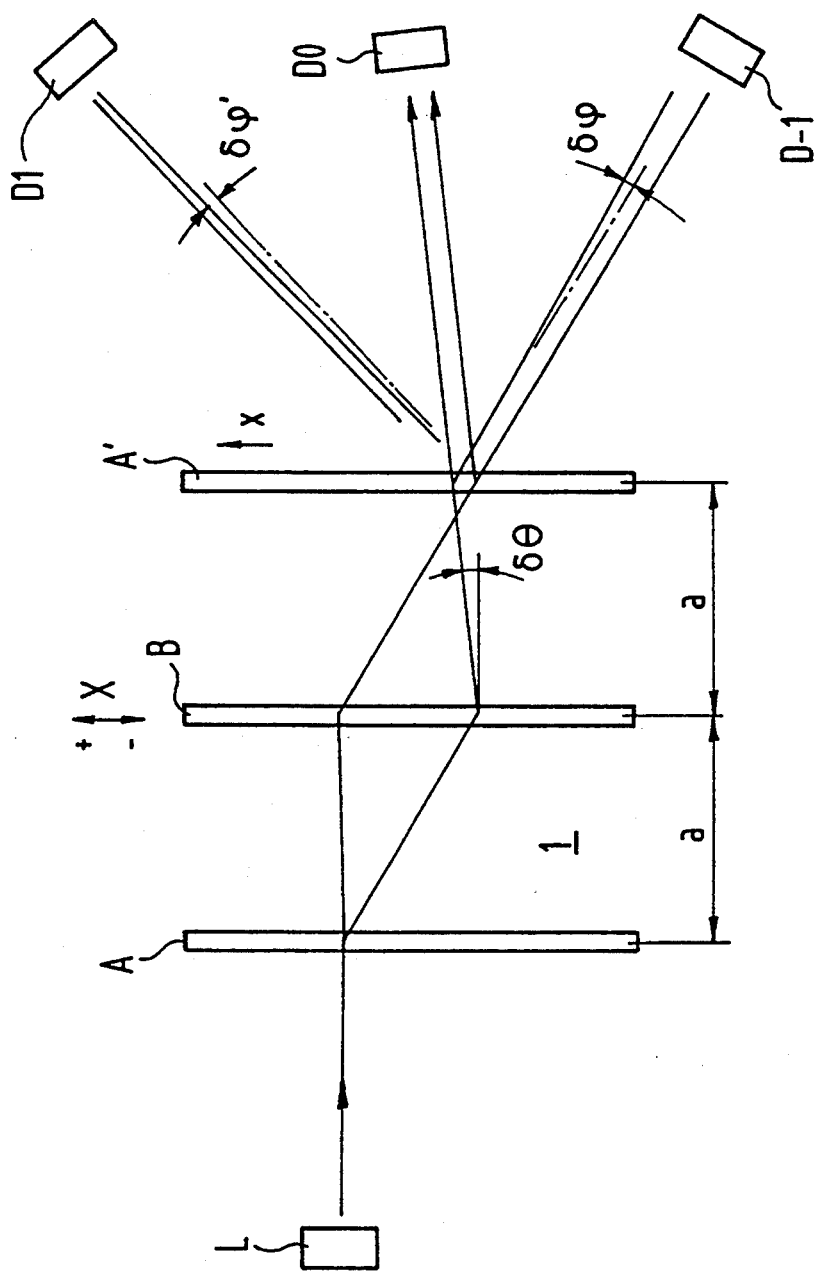
FIG. 1 is a schematic view a transmitted light arrangement, with three identical chirped gratings in the zero position (X=0) in accordance to one embodiment of the present invention.

FIG. 1 schematically shows an embodiment of a measuring instrument, indicated generally as 1, operating by the incident light method and employing a three grating transducer. For the sake of simplicity, only a few diffraction rays have been shown to illustrate the FIG. 1 embodiment. Three diffraction gratings A, B, A' are employed, each having no periodic scale graduation. The chirped gratings A, B and A' have an identical scale graduation. The beam of a collimated, incoherent light source L (such as a LED, light emitting diode) is split into fractional beams at the transmission grating A. These fractional beams are deflected at the reflection grating B and finally superimposed on the grating A' and made to interfere with one another. The detectors D-1, D0, D1 detect the beams having the resultant diffraction orders of $-1$, 0 and $+1$.

As indicated in FIG. 1, grating B is displaceable along the direction x of graduation. However, to better describe the invention, the description to follow will focus on the configuration when grating B is located in the position $X = 0$. In the $X = 0$ position corresponding grating fields of the gratings A, A' and B are opposite one another. The above described configuration of the gratings A, B, and A' produces beam inclinations $\delta\Theta$, $\delta\phi$, $\delta\phi'$ between the fractional beams. The beam inclinations occur by the influence of the location-dependent grating constants of each grating A, B, and A'. Consequently, phase displacements between the fractional beams will result, wherein the amount of phase displacement will depend on the spacing "a" between adjacent gratings.

The above-mentioned phase displaced fractional beams are then measured with the aid of the detectors D-1, D0, D1 to produce the signal course $S_n(X)$ (where $n = -1, 0, 1$ and stands for the nth resultant order). Since it is desirable to have $S_n(X)$ independent of the spacing "a" of the gratings A, B, A', the phase displacements must be kept small. This condition can be met if the variation $\delta d(x)\delta x$ of the local grating constant $d(x)$ remains limited to low values. In practice this can be obtained by means of a suitably long grating scale graduation.

Figure 2:
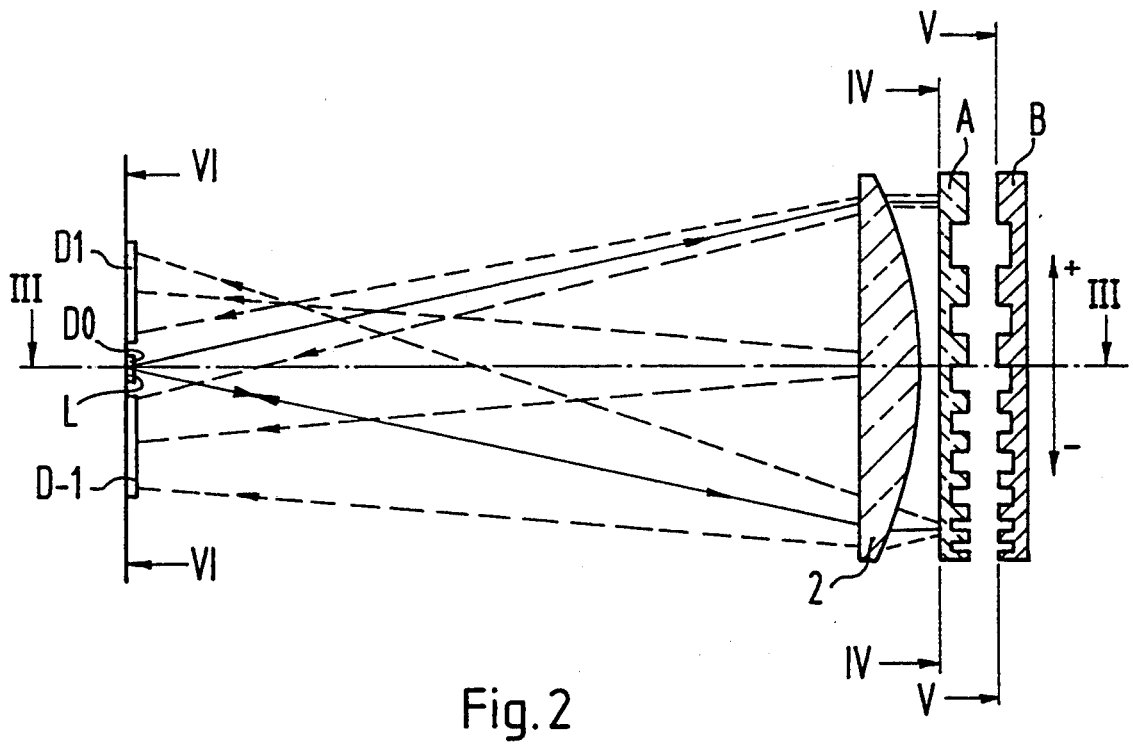
FIG. 2 shows a schematic view of a measuring instrument operating by the incident light method in accordance to a second embodiment of the present invention.

In FIG. 2, another embodiment of a device according to the invention, operating by the incident light principle, is shown. The radiation from a light source L (such as a LED) is collimated by a condenser 2 and diffracted and reflected at the phase transmission grating A and phase reflection grating B, respectively. Diffraction images of the 0th and higher order of the light source L arise in the focal plane of the condenser 2 and are detected by the photoelements D-1, D0 and D1. The photoelements D-1 and D1 have an adequate length to be capable of receiving the various diffraction angles of the chirped gratings in the resultant $-1$st or $+1$st order.

Figure 3:
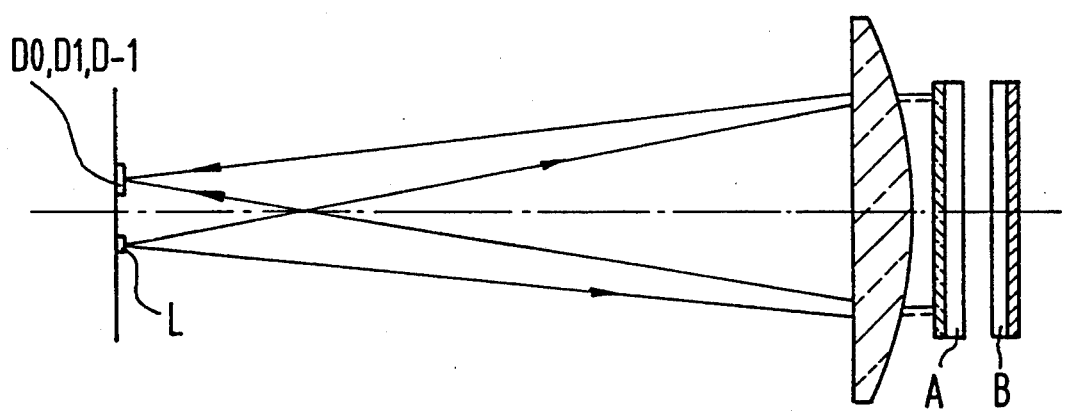
FIG. 3 is a plan view of the measuring instrument of FIG. 2 in a section taken along the line III—III.

In FIG. 3, the measuring instrument of FIG. 2 is shown in a plan view along the line III—III. The light source (L) is disposed offset with respect to the optical axis. Consequently, the diffraction images of the 0th order are not reflected back to the light source but instead fall, offset, onto the correspondingly disposed photodetector D0. However, the light source may remain on the optical axis if only orders higher than the 0th order are evaluated.

Figure 4:
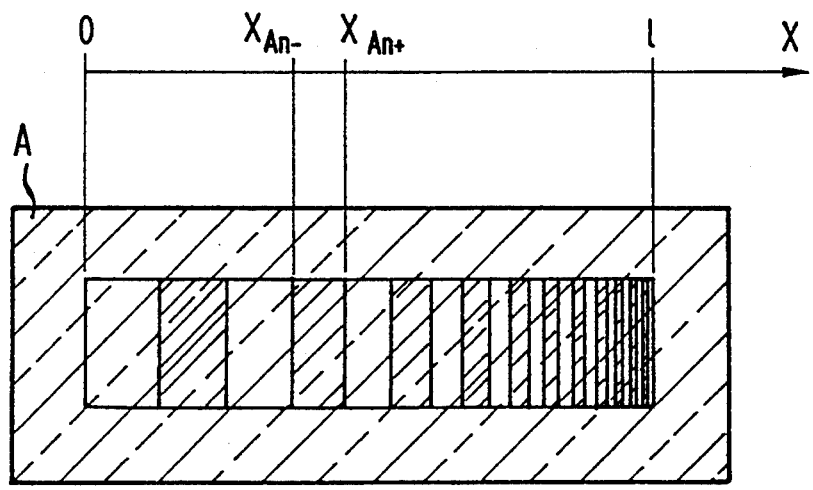
FIG. 4 is a fragmentary elevation view of a scanner plate taken along the line IV—IV of FIG. 2.
Figure 5:
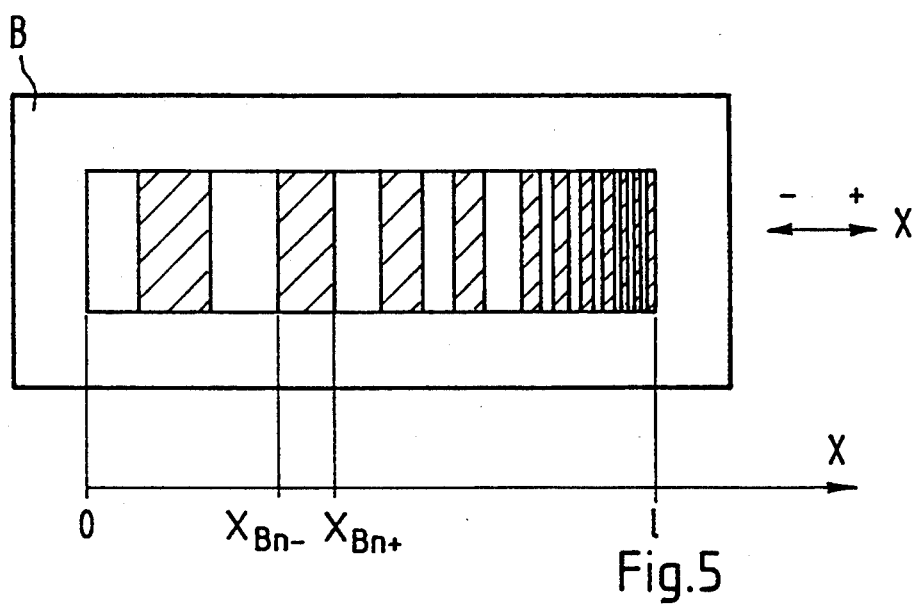
FIG. 5 is a fragmentary elevation view of a reflex phase grating taken along the line V—V of FIG. 2.
Figure 6:
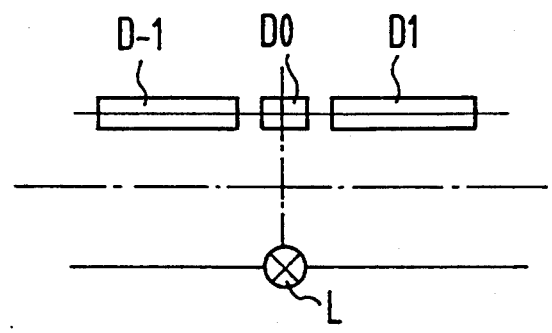
FIG. 6 is an elevation view of the light source and photoelements in the focal plane of the condenser, taken along the line VI—VI of FIG. 2.

European Patent Document 0 163 362 B1 discloses the capability of adjusting the phase displacement between the resultant diffraction orders by means of the grating parameters. According to the present invention, this phase displacement can be adjusted independently for any frequency component, by suitably selecting the local grating parameters. For example, the chirped gratings A and B as shown in FIGS. 4 and 5 illustrate the adjustment of the phase displacement. In FIG. 4, grating A is shown where the edges $x_{An-}$ and $x_{An+}$ of the nth field are shifted relative to the edges $x_{Bn-}$ and $x_{Bn+}$ of the nth field of grating B of FIG. 5, in order to attain a phase displacement of the signal.

Figure 7:
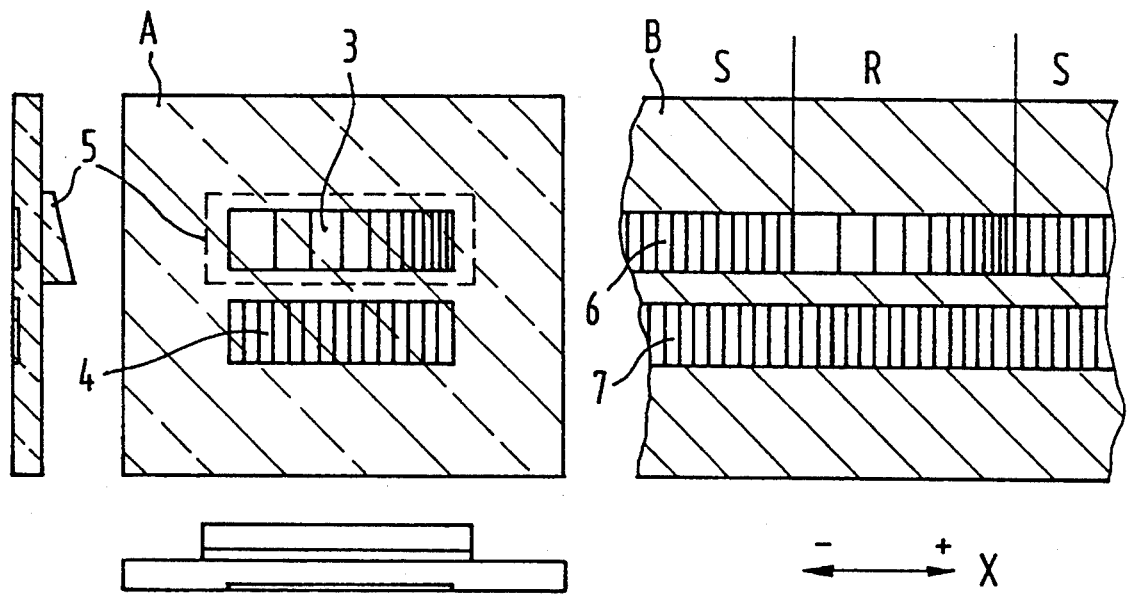
FIG. 7 shows an embodiment of an arrangement of gratings including a scanner plate and a graduation-carrying substrate, for an incremental length measuring system with a reference pulse in accordance with an embodiment of the invention.

FIG. 7 shows one embodiment of an arrangement of gratings on the scanner plate A and the graduation-carrying substrate B for an incremental length measuring system with a reference pulse. The periodic graduation field 4 of the scanner plate A, together with the periodic scale graduation 7 of the graduation-carrying substrate B, serves to generate the incremental signals of the length measuring transducer. The chirped grating of the graduation field 3 of grating A, together with the graduation track 6 of the graduation-carrying substrate B, generates the reference pulse.

The graduation track 6 of substrate B is divided into a region R with a chirped grating and adjoining regions S, which are periodically divided. To generate a reference pulse in the X=0 position of the graduation-carrying substrate B, the graduation field 3 of scanner plate A is located above the region R of the graduation track 6 of substrate B. The chirped gratings are designed such that in the resultant 0th diffraction order, a clock signal is generated, while in the ±1st diffraction orders, an inverted clock signal is generated. If the graduation-carrying substrate B is shifted out of the X=0 position, then the periodic grating in region S of the graduation track 6 assures that more light will fall on the photoelements for the inverted clock signal than on the photoelement for the clock signal. In a known manner, the clock and the inverted clock signals can be connected differentially, and the reference pulse can be triggered upon a threshold level in the vicinity of the zero level. In this way, the reference pulse remains independent, over a wide range, of the illumination intensity. Finally, a prism 5 serves to separate the diffraction beams of the reference pulse and those of the incremental length measuring transducer.

Figure 8:
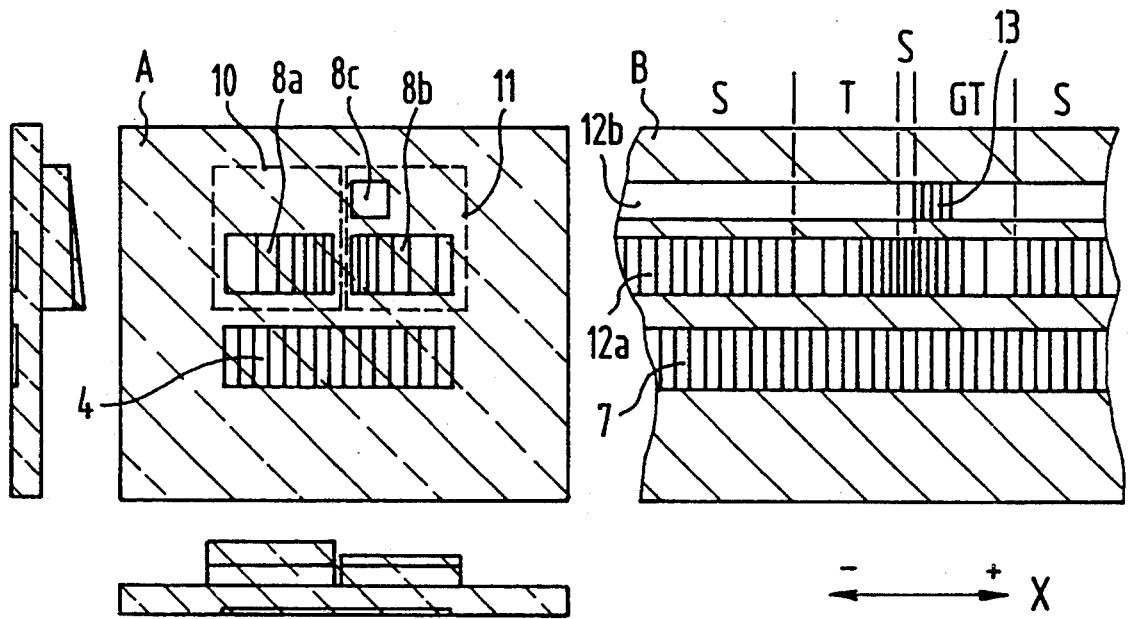
FIG. 8 shows another embodiment of an arrangement of gratings for an incremental length measuring system with a reference pulse.

FIG. 8 shows a further exemplary embodiment for an incremental length measuring transducer with a reference pulse. The scanner plate A not only has the graduation field 4 for the incremental length measuring transducer, but also two separate graduation fields 8a and 8b with chirped gratings, and a window 8c without graduations. A prism 10 directs the 0th resultant order of diffraction of field 8a to a photoelement for the clock signal. The 0th resultant diffraction orders of fields 8b and 8c are carried jointly, by means of a prism 11, to a photoelement for the inverted clock signal. In this arrangement using a reference pulse transducer, the ±1st resultant orders of diffraction are not evaluated.

Figure 9:
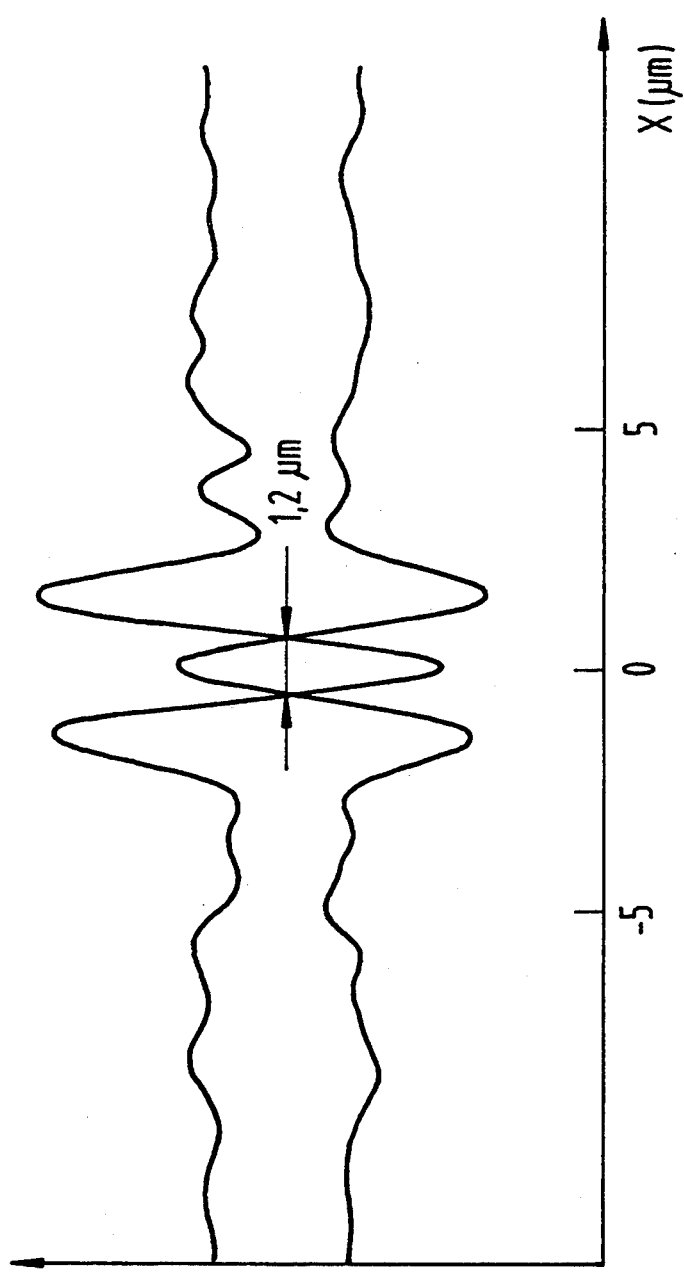
FIG. 9 shows a typical signal course of a reference pulse, produced with a scanner plate and graduation-carrying substrate of FIG. 8.

A reference pulse is output when the graduation-carrying substrate B is in the X=0 position. In the X=0 position, the chirped graduation field 8a is located above the range T of the track 12a of the graduation-carrying substrate B, and the field 8b is above the region GT. The chirped gratings are designed such that in the X=0 position, a maximum clock signal and a minimum inverted clock signal are generated as seen in FIG. 9.

The minimum inverted clock signal in the X=0 position is attained by a displacement of the grating fields of the graduation window 8b relative to the associated grating fields of region GT on the track 12a by approximately one-fourth the local grating constant. The reversed orientation of the chirped gratings for the clock and inverted clock signals should also be noted, so that the smallest local grating constant in each case is on the inside. If the graduation window 8a belonging to the clock signal is shifted across the region GT of the track 12a, then no further signal pulse is produced.

Outside the zero position X±0, the inverted clock signal is raised relative to the clock signal, and the immunity to interference is thereby increased, by means of a window 8c on the scanner plate and an additional track 12b on the graduation-carrying substrate B. Track 12b has a phase grating 13 for this purpose, whose 0th diffraction order is suppressed by the selection of grating parameters, and also has adjoining reflecting regions. Only in the X=0 position does the grating 13 prevent radiation from falling through the window 8c onto the photoelement for the inverted clock signal. A light-absorbing region on the track 12b may be provided, instead of a grating, to prevent radiation from falling through window 8c onto the photoelement for the inverted clock signal.

Figure 16:
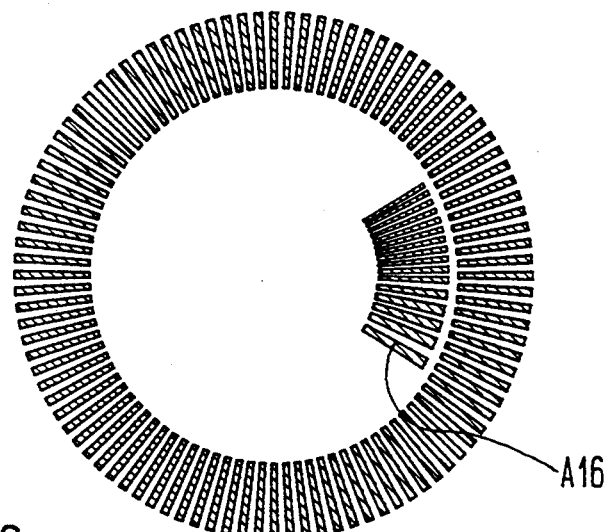
FIG. 16 shows a chirped radial grating to be used in the present invention.

It is known that the three-grating principle can also be used for angle encoders. It is therefore within the scope of the invention to embody an angle encoder in accordance with the invention as well, either by using chirped radial graduations—as shown in FIG. 16 —or applying chirped graduations onto cylinder surfaces.

With the aid of the device described here, highly different signal shapes can be produced as a function of a displacement X, depending on the embodiment of the chirped gratings. The use of this device is not limited to this generation of reference pulses. For instance, suitable signal courses for various zero sensors may otherwise be generated.

Figure 10:
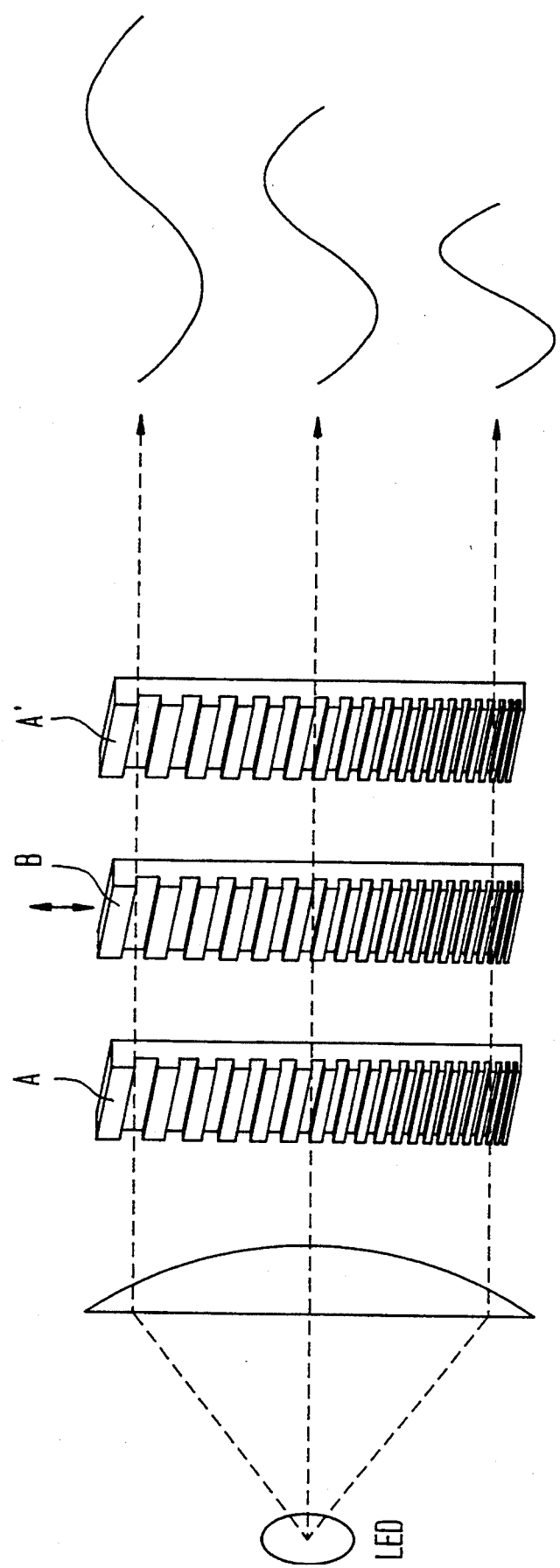
FIG. 10 is a schematic drawing of an embodiment of a position measuring instrument which employs the elements shown in FIG. 1.
Figure 11:
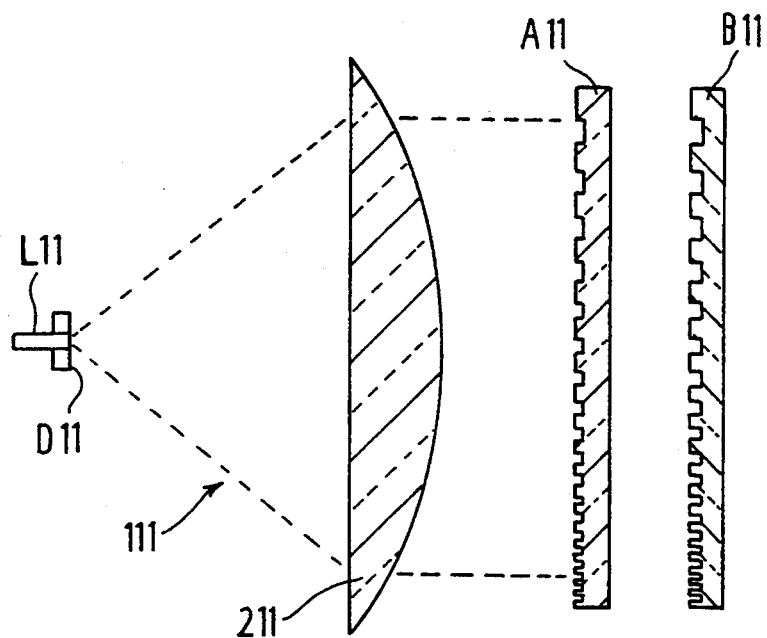
FIGS. 11-15 show various measuring instruments using various embodiments of the present invention using different scanning principles.
Figure 12:
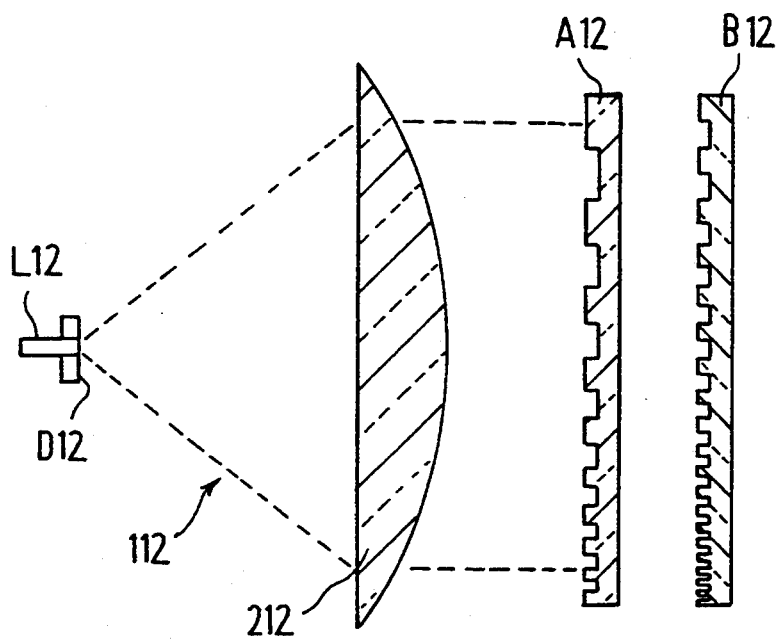

Other embodiments of three grating transducers are possible as illustrated in FIGS. 10–12. As an example, FIG. 10 shows a position measuring instrument similar to the one described in FIG. 2 and a special structure for the diffraction gratings A, B and A'.

In FIG. 11, a further measuring instrument 111 is schematically shown in the form of a three-grating transducer. The mode of operation of this arrangement is similar to that of the device described in FIG. 2, except that a chirped amplitude grating A11 is used as a scanning graduation. Use of grating A11 results in the various resultant orders of diffraction to furnish signals having the same phase location and therefore need not be separately directed onto photoelements D11. A short-focal-length lens 211 may be used as well.

In FIG. 12, the chirped scale graduation B12 has half the local graduation period (corresponding to local grating constant) at each point, compared with the corresponding point of the chirped scanning graduation A12. The collimated beam of the light source L12 is split by the chirped graduation A12 (preferably a phase grating) into a +1st and −1st diffraction order. The scale graduation B12 (likewise a phase grating) directs these diffraction orders each back into the opposite direction, so that as a result of the graduation A12 having the 0th resultant diffraction order they can be made to interfere and can be detected by the photoelement D12.

Other scanning methods than the three-grating transducer described here may also be used, if the periodic graduations are replaced with corresponding chirped graduations. Especially advantageous methods permit scanning of the scale largely independently of its spacing. If chirped graduations are used, any local graduation period, given a fixed spacing of the scale, must furnish a corresponding oscillating signal proportion. With spacing-independent scanning methods, symmetrical diffraction orders of the scale (typically ±1st orders) are preferentially made to interfere. This leads to a signal period, typical for this method, that is equal to a fraction of the graduation period.

Several other suitable scanning methods for generating reference pulses with the aid of chirped gratings are described below. For example, two-grating transducers may be used as shown in FIGS. 13 and 14 or a single-grating transducer as shown in FIG. 15 may be employed.

Figure 13:
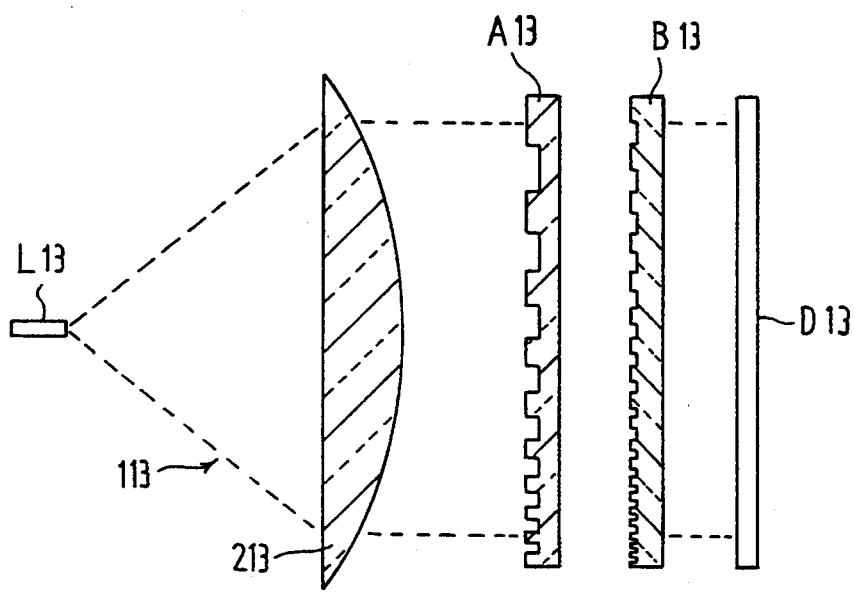

In FIG. 13 a two-grating transducer is illustrated which uses transmission graduations A13 and B13. B13 has half the local graduation period compared with the corresponding parts of A13 at the location of the graduation B13, the first two diffraction orders of the graduation A13 (preferably a phase grating) form a strip system, which is scanned with the aid of the amplitude grating B13 and is detected by a detector D13. The amplitude grating B13 can also be applied directly to the detector D13, so that this diffraction element may be embodied by a structured detector.

Figure 14:
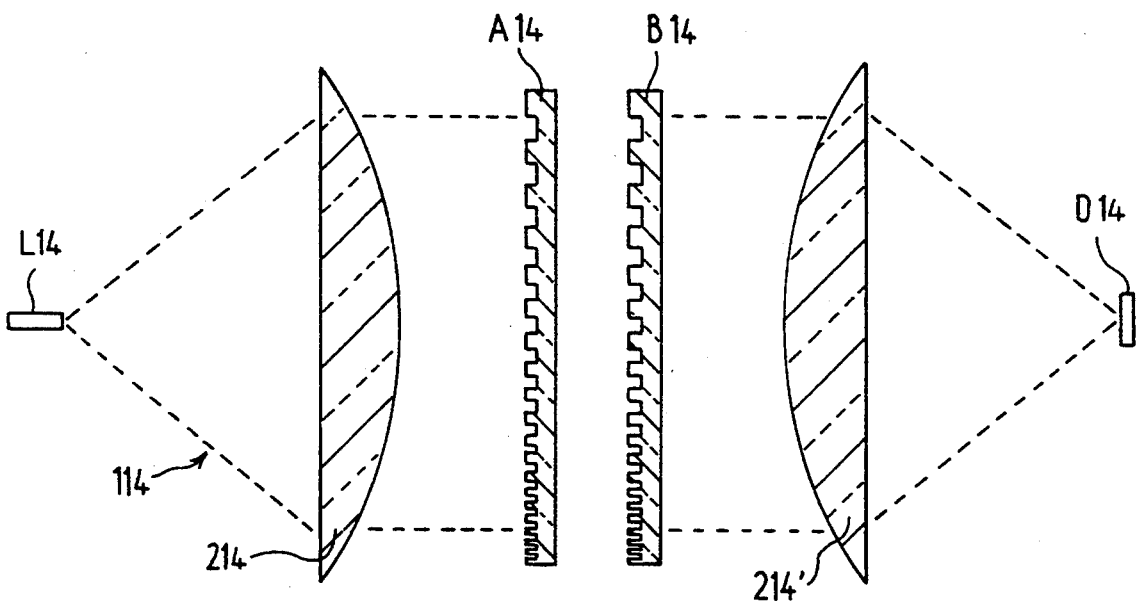

Another embodiment of a two-grating transducer is shown in FIG. 14 wherein a collimated beam from the light source L14 is split by the chirped transmission graduation A14 (preferably a phase transmission grating) into a +1st and a −1st order of diffraction and is directed back in the direction of a resultant 0th order of diffraction by the chirped transmission graduation B14 (likewise preferably a phase transmission grating). A photoelement D14 detects the resultant 0th order of diffraction.

Figure 15:
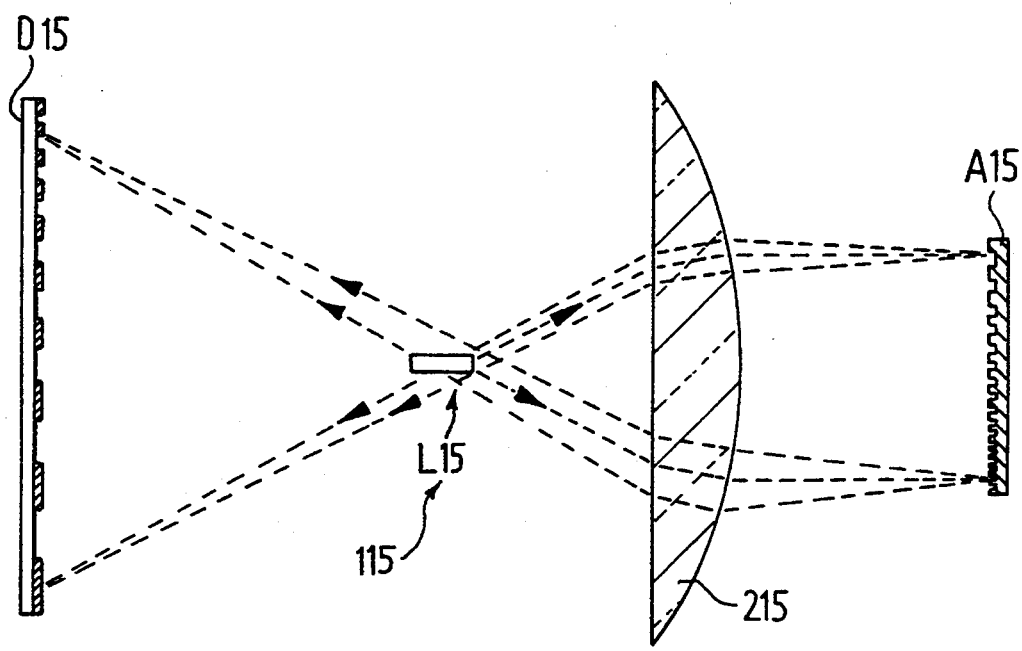

In FIG. 15, a single-grating transducer 115 is shown. The light of a light source L15 (preferably a semiconductor laser) is collimated by a lens 215 and directed onto a chirped reflection graduation A15 (preferably a phase reflection grating). The reflected beam is split into a +1st and a −1st diffraction order. A projection lens (in this case the same lens 215) projects the chirped graduation A15 onto the detector D15 and thus superimposes the two orders of diffraction. The resultant interference strip system, with a varying strip spacing, is detected by means of a photo element D15, which is structured in the manner of a chirped grating. The local structuring period of the photo element D15 depends on the scale of projection of the projection lens 215, among other factors.

Figure 17:
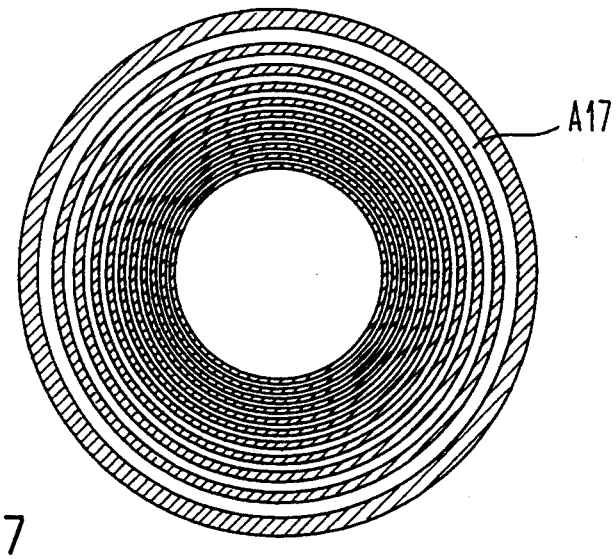
FIG. 17 shows a diffraction grating with concentric circles to be used in the present invention.
Figure 18:
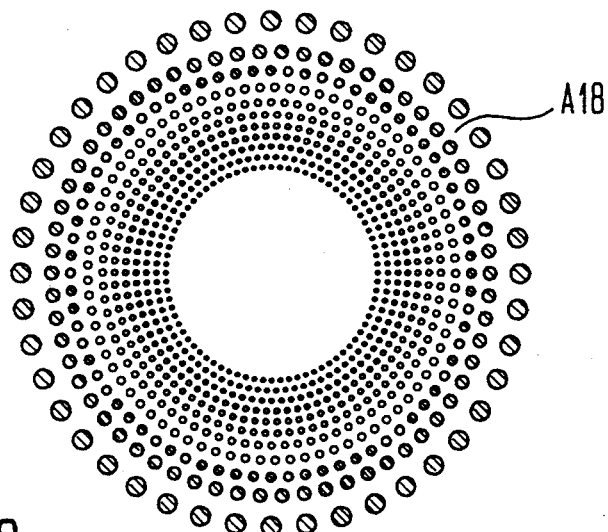
FIG. 18 shows a diffraction structure comprising individual circles to be used in the present invention.

Though the measurement systems described previously used diffraction gratings, other diffracting elements may be used, if their diffracting structure varies in a location-dependent manner and continuously. Examples of such diffracting elements are radial graduation segments, a succession of single diffraction elements in the form of circular disks, or dots instead of grating rulings as can be seen for example in FIGS. 16–18, respectively.

Also, one may use chirped gratings as so-called superlattice gratings. Periodically divided superlattice gratings have more than one grating field in each graduation period. By means of a superlattice, the diffraction efficiency of various orders of diffraction can be purposefully increased or attenuated. If periodic superlattice gratings are used as a scanning and/or scale graduation in a three-grating transducer, then scanning signals are obtained of which the harmonic content depends on the superlattice. With a suitable selection of the superlattice, the signal component with twice the frequency (half the signal period, second harmonic) and/or even higher harmonics can be reinforced to amplitude values of the fundamental wave.

Figure 19:
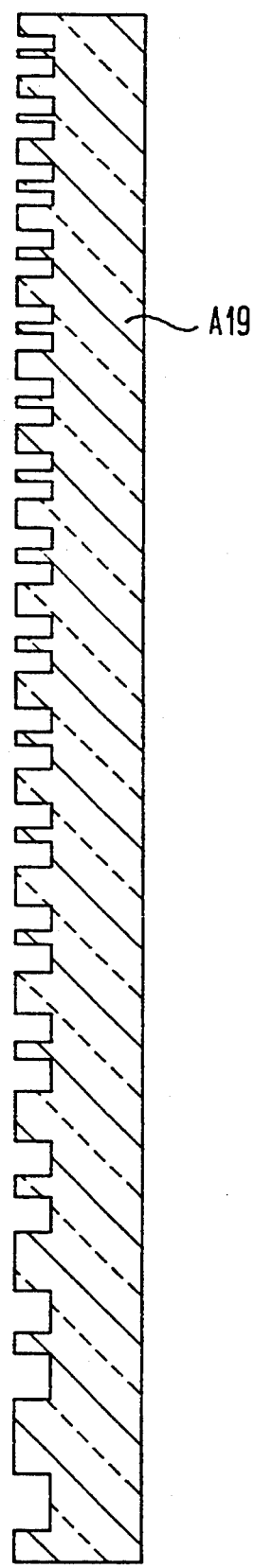
FIG. 19 shows a chirped superlattice grating to be used in the present invention.

Chirped superlattice gratings likewise contain more than one grating field in each local graduation period, as is shown in FIG. 19 in the form of a scale A19. Given a suitable selection of the superlattice, any point on the grating arrangement in the vicinity of the X = 0 position of the gratings furnishes not only a signal component with a period equal to one-half of a local graduation period (fundamental wave), but also a signal component having a period equal to one-fourth of a local graduation period (second harmonic) or even higher harmonics. If the local graduation period of the chirped gratings varies, for instance from $d_0$ to $2d_0$, then the derived signal in the vicinity of the X=0 position includes components with signal periods $d_0/2 \ldots d_0$ (fundamental wave) and $d_0/4 \ldots d_0/2$ (second harmonic) or $d_0/2n \ldots d_0/n$ (nth harmonic). A signal with a wide frequency spectrum is thus obtained with only a small variation in the local graduation period. A small variation in the local graduation period (characterized by the aforementioned chirp parameter delta $d(x)$/delta x) permits an especially great tolerance, however, in terms of changes in spacing of the gratings and/or shortening of the length of the chirped gratings.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. An interference device for generating signals, comprising:
    a light source;
    at least two diffraction elements with identical or different diffraction structures; and
    detectors for detecting diffracted, mutually interfering fractional beams, wherein each of the diffraction structures of the diffraction elements has a scale period $d=d(x)$ that varies continuously as a function of x, a direction of graduation of the diffraction element.

2. The interference device of claim 1, wherein said diffraction elements comprise diffraction gratings wherein each grating has a respective grating constant.

3. The interference device of claim 2, wherein said grating constants of the diffraction gratings are different and vary continuously as a function of x, the direction of graduation.

4. The interference device of claim 2, wherein said diffraction gratings comprise concentric circles, whose radial spacings are different and vary continuously as a function of a radial direction of graduation.

5. The interference device of claim 2, wherein the diffraction gratings have a field height that varies as a function of x, the direction of graduation of the diffraction element.

6. The interference device of claim 2, wherein the diffraction gratings have a field width that varies as a function of x, the direction of graduation of the diffraction element.

7. The interference device of claim 2, wherein the diffraction gratings have a field length that varies as a function of x, the direction of graduation of the diffraction element.

8. The interference device of claim 2, wherein the diffraction gratings transmit light from the source of light having a signal shape that varies as a function of x, the direction of graduation of the diffraction element.

9. The interference device of claim 2, wherein the diffraction gratings absorb light from said light source as a function of x, the direction of graduation of the diffraction element.

10. The interference device of claim 2, wherein the diffraction gratings have one or more fields each having a shape that varies as a function of x, the direction of graduation of the diffraction element.

11. The interference device of claim 2, wherein the diffraction gratings comprise chirped gratings.

12. The interference device of claim 1, comprising an additional, periodic grating scale graduation.

13. The interference device of claim 1, wherein said light source generates incoherent light.

14. The interference device of claim 13, wherein said light source is a light-emitting diode.

15. The interference device of claim 1, wherein said diffracting structures comprise a continuous succession of single diffracting elements, which are embodied in the form of circular disks.

16. The interference device of claim 1, wherein said diffraction elements comprise diffraction gratings having a superlattice.

17. The interference device of claim 16, wherein said superlattice comprises more than one grid field per local grid constant.

18. The interference device of claim 1, wherein said diffraction structure comprises a radial graduation.

19. The interference device of claim 12, wherein said diffraction structure comprises a radial graduation.

20. The device of claim 1, wherein said diffraction elements comprise phase gratings.

21. The device of claim 1, wherein said diffraction gratings comprise amplitude gratings.

22. The device of claim 2, wherein one of said diffraction gratings has one-half the grating constant of the corresponding diffraction grating.

23. The interference device of claim 1, wherein said detector is embodied as a structured diffraction element.

24. The interference device of claim 1, comprising a transmission grating and a reflection grating.

25. The interference device of claim 1, comprising two transmission gratings.

26. An interference device for generating signals, comprising:
a light source;
a single diffraction element having a diffraction structure to produce mutually interfering fractional beams, and wherein said diffraction structure has a scale period $d=d(x)$ that varies continuously as a function of x, a direction of graduation of the diffraction element.

27. The interference device of claim 26, wherein said single diffraction element comprises a reflection grating.

28. The interference device of claim 27, comprising a projection lens, and a structured detector.

29. A zero sensor, comprising:
a light source;
at least two diffraction elements with identical or different diffraction structures; and
detectors for detecting diffracted, mutually interfering fractional beams, wherein each of the diffraction structures of the diffraction elements has a scale period $d=d(x)$ that varies continuously as a function of x, a direction of graduation of the diffraction element.

* * * * *

UNITED STATES PATENT AND TRADEMARK OFFICE
CERTIFICATE OF CORRECTION

PATENT NO. : 5,428,445
DATED : June 27, 1995
INVENTOR(S) : Wolfgang Holzapfel

It is certified that error appears in the above-indentified patent and that said Letters Patent is hereby corrected as shown below:

<u>On the Title Page</u>

In column 2, after "Attorney, Agent, or Firm" delete "Hofer Willian Brinks Gilson & Lione" and substitute --Willian Brinks Hofer Gilson & Lione"

Column 10,

In Claim 21, line 2, delete "gratings" and substitute --elements--.

Signed and Sealed this

Twenty-seventh Day of February, 1996

Attest:

BRUCE LEHMAN

Attesting Officer     Commissioner of Patents and Trademarks